United States Patent Office 3,126,265
Patented Mar. 24, 1964

3,126,265
PROCESS AND APPARATUS FOR SEPARATING CONDENSABLES FROM COMPRESSED GAS
Edward F. Yendall, Kenmore, Carl P. Andersen, Tonawanda, Reagan Houston, Williamsville, and William F. Mesinger, Tuckahoe, N.Y., assignors to Union Carbide Corporation, a corporation of New York
Filed Jan. 27, 1959, Ser. No. 789,285
23 Claims. (Cl. 62—14)

This invention relates to an improved process of and apparatus for separating low-boiling condensables from a compressed gas stream, and more particularly to improved process and apparatus for separating the carbon dioxide contaminant from compressed atmospheric air prior to low temperature rectification of such air into air components.

Atmospheric air contains substantial quantities of carbon dioxide and hydrocarbon impurities, and when these impurities are not removed by chemical treatment of the air or by adsorption therefrom, they will deposit as solid particles on the air side heat exchange surfaces as the air is cooled, thus causing well-known difficulties.

In the majority of air separation plants employing relatively low air supply pressures, most of the carbon dioxide and other condensables are removed from the incoming air and deposited in a reversible heat exchange zone by heat exchange with outgoing air separation products serving as purge gas. This zone may comprise heat exchangers of the regenerative or passage exchanging types. In order to avoid progressive build-up carbon dioxide solid particles in such heat exchange zone, the zone must be "self-cleaning." This means that all of the impurities deposited in the zone during an air intake stroke must be evaporated and swept out during the next succeeding purge gas stroke. The self-cleaning condition may not be achieved by simply passing the rectification products through the reversible heat exchange zone as purge gas, because compressed air, especially at low temperatures, has a substantially greater specific heat than the non-compressed air separation products e.g. oxygen and nitrogen.

The prior art has devised many ways of alleviating this condition, one of which involves partially cooling the incoming air stream in the reversible heat exchange zone and withdrawing a minor portion or side-bleed of the partially cooled air stream for separate cleaning while the major portion is further cooled in the heat exchange zone. Most of the carbon dioxide content of the major portion is removed by deposition in such zone. Since by this arrangement, the volume of outgoing air separation products passing through the colder part of the zone is substantially greater than the volume of incoming air passing through this part, the reversible heat exchange zone can be made self-cleaning. However, the problem of removing the carbon dioxide impurity from the partially cooled minor air portion still exists. One well-known expedient is to further cool the minor air portion in either of two heat exchangers piped in parallel, and remove the bulk of the carbon dioxide by deposition therein. The further cooled and partially cleaned side bleed air is finally cleaned in a scrubber and then rewarmed in the aforementioned heat exchanger prior to expansion with the production of external work. When one of the exchangers becomes partly plugged with carbon dioxide after a few hours use, the duplicate unit is placed in service so that the fouled exchanger may be thawed. This arrangement has the disadvantages that duplicate heat exchangers are both expensive and space consuming, and also require complicated piping and valving. Furthermore, switching from a partly fouled heat exchanger to a clean heat exchanger upsets the plant thus incurring a refrigeration loss, and the operation cannot be accomplished economically by automatic controls.

In another known method of processing the carbon dioxide laden side-bleed air, the latter is chilled well below the carbon dioxide saturation point by direct mixing with air which has been deeply cooled to almost liquid temperature by passage through the entire length of the reversible heat exchange zone. Unfortunately this scheme has several important disadvantages. If direct mixing is used, local precipitation of carbon dioxide is likely to occur at the point of mixing, thus requiring a filter to remove the solid particles. Also, if colder air is mixed with the side-bleed air, a larger quantity of air must be processed by the filter, and a larger filter must be used to avoid a higher pressure drop. For control purposes, it is desirable to maintain the pressure drop in the side-bleed circuit as low as possible. Furthermore, to mix the deeply cooled or "cold end" air with the side-bleed air, the latter must be slightly throttled. This is because the undiverted air is subjected to additional pressure drop in passing through the colder part of the reversible heat exchange zone. As a result of the side-bleed throttling necessity, if any part of the carbon dioxide-free throttled side bleed air is subsequently to be bypassed to the cold end air stream, the latter must also be slightly throttled to obtain flow in the desired direction. Throttling of the cold end air is undesirable as it substantially increases the air compression power costs.

Still another prior art method of cleaning side bleed air is to pass such stream directly to an adsorbent trap which operates at approximately the temperature of the side-bleed level in the reversible heat exchange zone. The disadvantage of such an arrangement is that the side-bleed temperature level required for maintaining the reversible heat exchange zone in a self-cleaning condition does not coincide with the optimum temperature for operating the adsorbent traps. The temperature level best suited for side bleeding the reversible heat exchange zone is about —100° C. or slightly warmer in order that the side-bleed air volume can be minimized and so that the equipment needed for processing this stream can be as small as possible. Furthermore, when passage exchanging type units are used in the reversible heat exchange zone, such units are usually arranged with two equally sized exchangers in series and with the side-bleed stream withdrawn between the two exchangers. This fixes mechanically the side-bleed temperature level at about —100° C. At such warm temperature levels, most adsorbents have a very limited capacity for holding carbon dioxide; and as a result, large duplicate adsorbent traps are required which must be operated on a short time cycle between thawings, e.g. 24 hours. Such operation represents a complication in the control of an air separation plant, and the frequent thawing requires the introduction of considerable heat into the system with consequent increase in power costs to offset the loss in refrigeration. When recuperative type heat exchangers are employed, the side bleed stream is often withdrawn at a somewhat colder temperature level as near as possible to the carbon dioxide deposition zone, e.g. —120 to —130° C. This results in some improvement in the carbon dioxide capacity of the adsorbent and permits a reduction in the size of the traps or an extension in the operating period between thawout. However, duplicate adsorbent traps are still required, and the operating periods between desorptions are still relatively short. The improvement of increasing the carbon dioxide capacity of the adsorbent is partially offset by the requirement for a larger volume of side-bleed air in order to maintain a self-cleaning condition.

A principal object of the present invention is to provide an improved process of an apparatus for separating low-boiling condensables from a compressed gas stream utilizing a side-bleed for unbalancing the reversible heat exchange zone.

A further object is to provide an improved process and apparatus for separating low-boiling condensables from a compressed gas stream, in which the aforedescribed side-bleed stream is cleaned of such condensables without the necessity of duplicate heat exchangers for processing such stream.

A still further object is to provide an improved process and apparatus for separating low-boiling condensables from a compressed gas stream, in which the piping and valving for handling the aforedescribed side-bleed stream is relatively simple and inexpensive.

Another object is to provide a more efficient process and apparatus for separating low-boiling condensables from a compressed gas stream, in which the refrigeration losses are reduced.

An additional object is to provide a process and apparatus in which the major air portion discharged from the cold end of the reversible heat exchange zone is not throttled.

These and other objects and advantages of this invention will be apparent from the following description and accompanying drawings in which.

The similar components of the various figures are designated with similar reference characters in the interest of simplicity.

Figure 1:
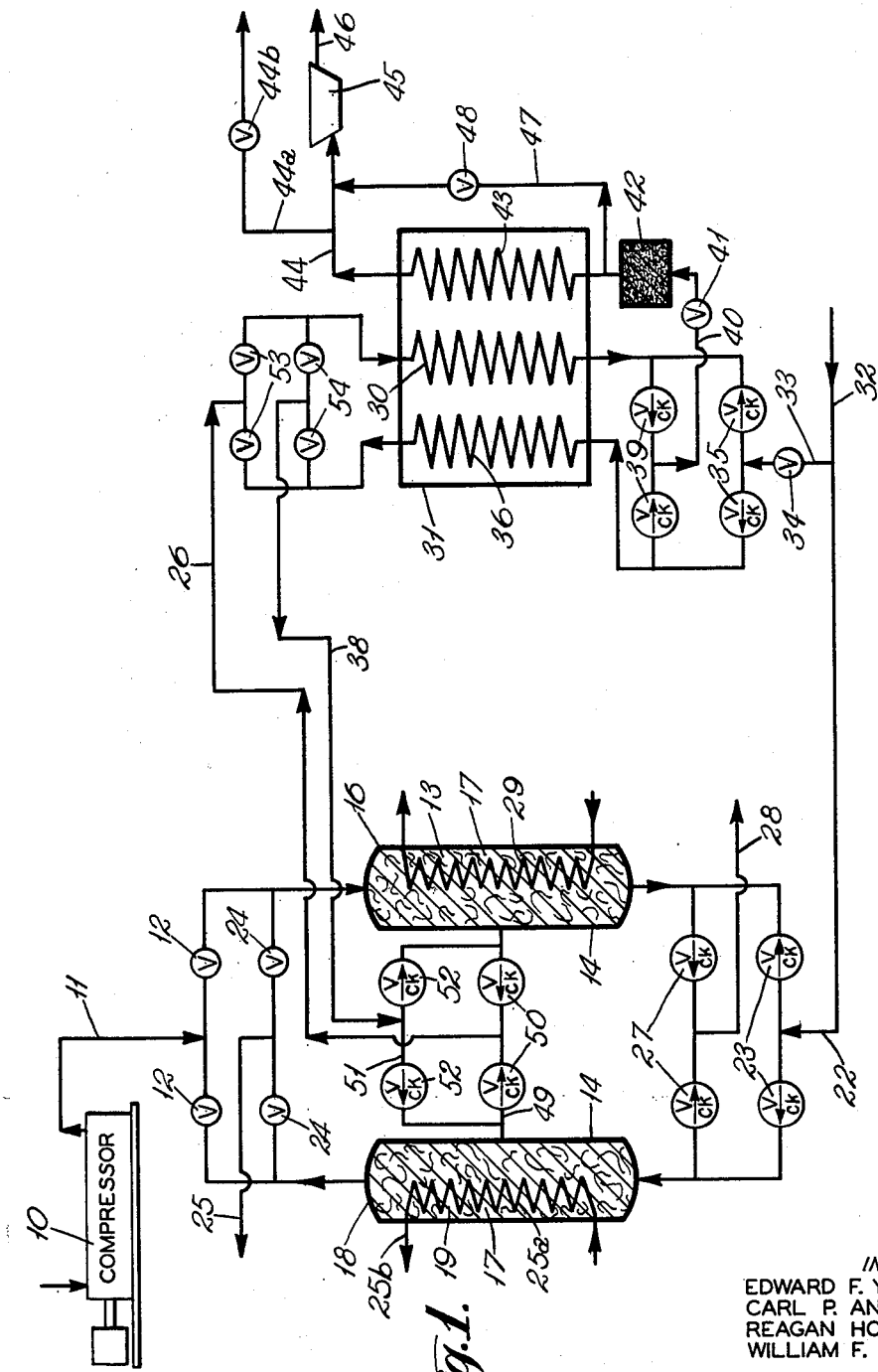
FIG. 1 shows a flow diagram of a system for cooling and cleaning an air stream preparatory for rectification into air components according to the present invention, in which the air side-bleed is further cooled and cleaned in a passage-exchanging heat exchanger.

According to the process of the present invention, a compressed gas stream containing low-boiling condensables is provided at an inlet pressure of below about 150 p.s.i.g., and passed to a first main reversible heat exchange zone. The inlet gas stream is partially cooled therein to a temperature slightly warmer than the saturation point of the low-boiling condensables, and divided into major and minor portions. The major portion is further cooled to a low temperature in such zone and at least most of its low-boiling condensables are deposited in the zone, the resulting cooled and cleaned major portion being discharged from the cold end. Meanwhile, the partially cooled minor or side-bleed portion of the compressed gas stream is withdrawn from the main heat exchange zone and conducted to a first reversing passageway in a second auxiliary reversible heat exchange zone. A cold, purge gas stream is provided at about the low temperature at the cold end of a second reversing passage of the second heat exchange zone, and a second cold gas stream preferably at about the aforementioned inlet pressure and said low temperature is provided at the cold end of a first non-reversing passageway of such zone. The partially cooled minor portion of the inlet gas stream is further cooled by heat exchange with the purge and second gas streams in the second heat exchange zone. By this step, the minor portion is cooled to a sufficiently low temperature for deposition of at least most of its low-boiling condensables in the first reversing passageway, and the further cooled and cleaned minor portion is discharged from the cold end of such passageway. In a preferred embodiment, at least part of the latter is recycled as the second cold gas stream back through the first non-reversing passageway in countercurrent heat exchange with the partially cooled minor portion flowing in the first reversing passageway of the second auxiliary heat exchange zone. The partially rewarmed second gas stream is then discharged from the warm end of the first non-reversing passageway at an intermediate temperature. The partially cooled minor portion and the purge gas stream are periodically reversed between the first and second reversing passageways for evaporation of the previously deposited condensables into the purge gas stream, and the partially warmed condensable-laden purge gas stream is discharged from the warm end of the second auxiliary reversible heat exchange zone. The flows in the second reversible heat exchange zone are preferably simultaneously reversed with the flows in the first reversible heat exchange zone. Thus, it can be seen that the present invention contemplates removal of condensables from the side-bleed stream in an auxiliary reversible heat exchange zone which is self-cleaning. The condensables are deposited in short-interval cycles and removed from the zone by purge gas.

The term "reversible heat exchange zone" as used in the specification and the accompanying claims refers to cooling and cleaning of the compressed gas stream by heat exchange either with a colder fluid in a thermally associated reversing passageway, or through an intermediate refrigeration storage means such as accumulator packing, as well known to those skilled in the art and described in Trumpler U.S. Patent 2,460,859 for reversing heat exchangers, and Frankl U.S. Patent 1,890,646 for accumulators. The term "clean" used herein to describe the various gas streams refers to a low content of the low-boiling condensables relative to the maximum or saturation content of such condensables.

In a preferred embodiment of this invention, any condensables remaining in the further cooled and cleaned minor portion of the compressed gas stream are removed before recycling through the first non-reversing passageway of the second auxiliary reversible heat exchange zone. Also, when the present invention is used for cooling and cleaning compressed air prior to low-temperature separation into air components, the cleaned and partially warmed recycled minor portion of the compressed air stream discharged from the warm end of the first non-reversing passageway is preferably expanded to a low pressure with the production of external work. This work producing type expansion step provides at least part of the low temperature refrigeration requirements of the air separation plant.

Although the invention will be described in detail with respect to processing a compressed air stream preparatory to low temperature rectification into air components, it is to be understood that the invention is generally applicable to low temperature processes employing a reversible heat exchange zone which depends upon excess outflow for self-cleaning conditions. Examples of such processes in addition to air separation include preparation of synthesis gas, hydrogen purification and coke oven gas separation.

Referring now to the drawings and particularly to FIG. 1, air is compressed in compressor 10 to a pressure of less than 150 p.s.i.g. and preferably about 85 p.s.i.g., and the heat of compression may be removed by, for example, a water-cooled exchanger (not shown). The compressor discharge air stream passes through conduit 11 and reversing valves 12 into the warm end of reversing passageway 13 of first main or air-product reversible heat exchange zone 14. As illustrated, passageway 13 is the shell section of accumulator 16 which is filled with regenerative packing material 17, the latter serving as an intermediate refrigeration storage means and impurity deposition surface. A second accumulator 18 containing reversing passageway 19 is piped in parallel with accumulator 16, and provides the other part of the first main reversible heat exchange zone 14. The compressed air stream flowing around packing 17 is cooled by the refrigeration previously stored in the packing during a purge gas stroke by a purge gas stream which, for example, may be a separated air component such as nitrogen. The latter enters the cold end of reversible heat exchange zone 14 through conduit 22 and check valves 23 therein, and emerges through valves 24 and conduit 25 as warmed condensable-laden purge gas. This gas may be discharged to the atmosphere or further processed as desired. The air stream may also be cooled by heat exchange with an air separation product such as oxygen flowing countercurrently to the air through coils 25a embedded in regenerative packing material 17, the warmed oxygen being discharged from the warm end 25b of coils 25a for further processing as desired.

The entire compressed air stream is partially cooled in accumulator 16 to an intermediate temperature, e.g. —91° C., which is slightly warmer than the saturation point of the carbon dioxide impurity in such air. The air stream is divided into major and minor portions at such intermediate thermal level by withdrawing a minor portion or side bleed through conduit 26. The side-bleed air may constitute approximately 8% to 25% of the total inlet air stream, and preferably about 17%. The remaining major portion of the inlet air stream is further cooled by passage through the remaining colder part of accumulator 16 to a low temperature, e.g. —173° C., and simultaneous deposition of at least most of its carbon dioxide occurs on packing 17. The further cooled and cleaned major portion of the compressed air stream is discharged from the cold end of accumulator 16 through check valves 27 and conduit 28 for passage to the rectification means (not illustrated). The compressed air and nitrogen purge gas flows are periodically reversed between accumulators 16 and 18 so that the compressed air is cooled in accumulator 18 by the refrigeration previously stored in packing 17, and by the counterflowing product oxygen in coils 29. In the meantime, nitrogen purge gas flows from the cold to the warm end of accumulator 16 for evaporation of the carbon dioxide previously deposited therein by the compressed cooling air. The purge gas also serves to recool the packing 17 in preparation for the next air stroke.

Returning to the side-bleed air in conduit 26, the latter is withdrawn from either regenerator 16 or 18 through one of check valves 50 in side-bleed manifold 49 for passage into side-bleed conduit 26. It is then directed to the warm end valve manifold of second auxiliary or side-bleed reversible heat exchange zone 31 and passes through automatic valve 53 and into reversing passageway 30. Here it is cooled preferably to within 15° C. of the temperature of the major air portion discharged from the cold end of the first reversible heat exchange zone 14. Such temperature is sufficiently low for deposition in passageway 30 of at least most of the carbon dioxide contained in the side-bleed stream, and the further cooled and cleaned side-bleed air is discharged from the cold end of zone 31 through check valve 39 into conduit 40.

A cold, clean stream of gas, for example, nitrogen separated in the rectifying means (not shown) is supplied by conduit 32 at about the low temperature of the cold air in conduit 28. The major part of such stream is directed through conduit 22 to the main heat exchange zone 14 as purge gas. The minor part is passed through conduit 33 and control valve 34 for introduction through cold end check valve 35 into reversing passageway 36 where it flows in countercurrent direction to the cooling side-bleed air in reversing passageway 30. The nitrogen purge gas in passageway 36 evaporates carbon dioxide deposited therein during the previous air inlet stroke and the resulting partially warmed carbon dioxide ladened purge gas is discharged from the warm end of zone 31 through valve 54 and into purge gas conduit 38. In conduit 38, the purge gas stream at an intermediate temperature, e.g. about —96° C., is directed through check valve 52 in purge gas manifold 51 to a corresponding thermal level of purging accumulator 18. The remainder of the minor purge stream's refrigeration is recovered in accumulator 18 by flowing through the warmer portion thereof, along with the major purge gas stream entering the accumulator through conduit 22.

The further cooled side-bleed air and the purge gas flows are periodically reversed between passageways 30 and 36 by means of automatic valves 53 and 54 so that the side-bleed air flows through passageway 36 and the purge gas flows through passageway 30. Suitable means such as timing devices (not shown) may be employed to actuate automatic valves 12, 24, 53, and 54 in order to obtain the desired frequency of flow reversals in the main heat exchange zone and in the first auxiliary heat exchange zone. It will be noted that the arrangement of FIG. 1 permits independent operation of the two heat exchange zones so that each zone may be operated on the most favorable time cycle.

The further cooled side-bleed air in conduit 40 is directed through control valve 41 and preferably passed through cleanup means 42 for removing any residual traces of carbon dioxide from such stream. In some applications the cleaning achieved in reversing passageways 30 and 36 will be sufficient for the side-bleed stream. Usually, however, further cleaning is advantageous, especially when the side-bleed is to be subsequently processed at still lower temperatures in equipment such as distillation columns. Although any conventional apparatus such as a scrubber or a filter may be provided as the cleanup means 42, an adsorption trap filled with suitable material such as silica gel is preferred. The further cleaned, cold side-bleed air discharged from adsorber 42 is recycled through the second auxiliary reversible heat exchange zone 31 by passage through non-reversing passageway 43 in countercurrent heat exchange relation with the further cooling side-bleed air in either reversing passageway 30 or 36. The partially warmed recycled side-bleed air is discharged from the warm end of zone 31 into conduit 44, and is preferably expanded through turbine 45 to a relatively low pressure, e.g. 3 p.s.i.g., with the production of external work so as to provide at least part of the low-temperature refrigeration requirements of the air separation cycle. The work-expanded air may, for example, be passed through turbine discharge conduit 46 to the lower pressure rectification column (not shown). A portion of the further cleaned cold side-bleed air discharged from adsorber 42 into conduit 40 is preferably diverted through conduit 47 and control valve 48 therein, and bypassed around second auxiliary reversible heat exchange zone 31 to balance the flows in such zone. The bypassed portion may, for example, be directly mixed with the turbine inlet stream in conduit 44 so as to achieve maximum work expansion efficiency. Alternatively, cold end air may be diverted from conduit 28 for such turbine adjustment, or the bypassed portion may be directed to the cold end air stream in conduit 28 by means not illustrated.

In order to provide an additional degree of control flexibility normally required for effective operation of the turbine, a portion of the partially warmed recycled side-bleed air in conduit 44 may be diverted through line 44a and valve 44b. The diverted stream may, for example, join stream 28 for passage to the rectification. The additional flexibility provided by valve 44b permits control of the turbine 45 independently of zone 31 so that the turbine may be operated under optimum conditions. Since line 44a and valve 44b primarily benefit the turbine, these items or their equivalent may or may not be included in all embodiments of this invention described herein. It is to be understood, however, that similar provision may be employed in any or all embodiments to achieve proper performance of the low-temperature process.

It will be seen from the foregoing description that the second auxiliary reversible heat exchange zone 31 can be made self-cleaning by suitable adjustment of either or both the purge gas or recycle gas flows through such zone so as to achieve the necessary small cold end temperature difference. In this manner, the tendency to foul with carbon dioxide can be transferred to a large extent from the larger and more expensive first main heat exchange zone 18 to the smaller second auxiliary heat exchange zone 31. Also, the cleaning problem is much less severe in the second auxiliary heat exchange because a substantial part of the coolant is actually the recycle stream in nonreversing passageway 43 which is at the same pressure as the air side-bleed. Hence, these two streams have about equal specific heat characteristics and the diverging temperature difference pattern which tends to create fouling conditions in the main heat exchange zone 14 is much less pronounced in the auxiliary heat exchange zone 31. The less severe cleaning problem permits the latter zone to operate dependably with a high percentage of non-reversing outflow, i.e. with a relatively small volume of purge gas. This means that relatively little purge gas must be "borrowed" from the main heat exchange zone in order to clean the first auxiliary heat exchange zone, and that the amount of purge gas thus "borrowed" will be small in proportion to the volume of side-bleed air removed from the main heat exchange zone. Thus, flow conditions very favorable for self-cleaning are maintained in the main heat transfer zone where the effects of specific heat difference are most pronounced. In the first auxiliary heat exchange zone, the approximately equal specific heats of the gas streams plus the flexibility of control permit self-cleaning with minimum purge gas.

Another important advantage of the present invention is that when side-bleed adsorbent traps are used, the side-bleed take-off location is more flexible than in heretofore proposed cycles of this type. The side-bleed temperature level need not be compromised to suit efficient operation of the adsorbent trap, but can be chosen for optimum performance of the main reversible heat exchange zone, e.g. at the —80° C. to —100° C. level. If the side-bleed stream was cleaned up directly in an adsorbent trap, a considerably lower side-bleed temperature level would be required (—120° C. to —130° C.) in order to obtain efficient operation with reasonably sized traps. According to this invention, the trap 42 may operate at a very low temperature, e.g. —173° C., which temperature is essentially independent of the side-bleed take-off temperature. At such low temperature, the cleaning load on trap 42 will be comparatively light since most of the carbon dioxide is removed by freeze-out in the second heat exchange zone 31 and only a small amount will remain for removal by adsorption. Also, by operating trap 42 at low temperature, the adsorbent can hold a much higher weight percent of carbon dioxide. As a result, duplicate traps 42 are usually not required, and a single relatively small trap may be operated continuously without the necessity of thawing for an extended period equal to the thawing time of the rectification column.

Figure 2:
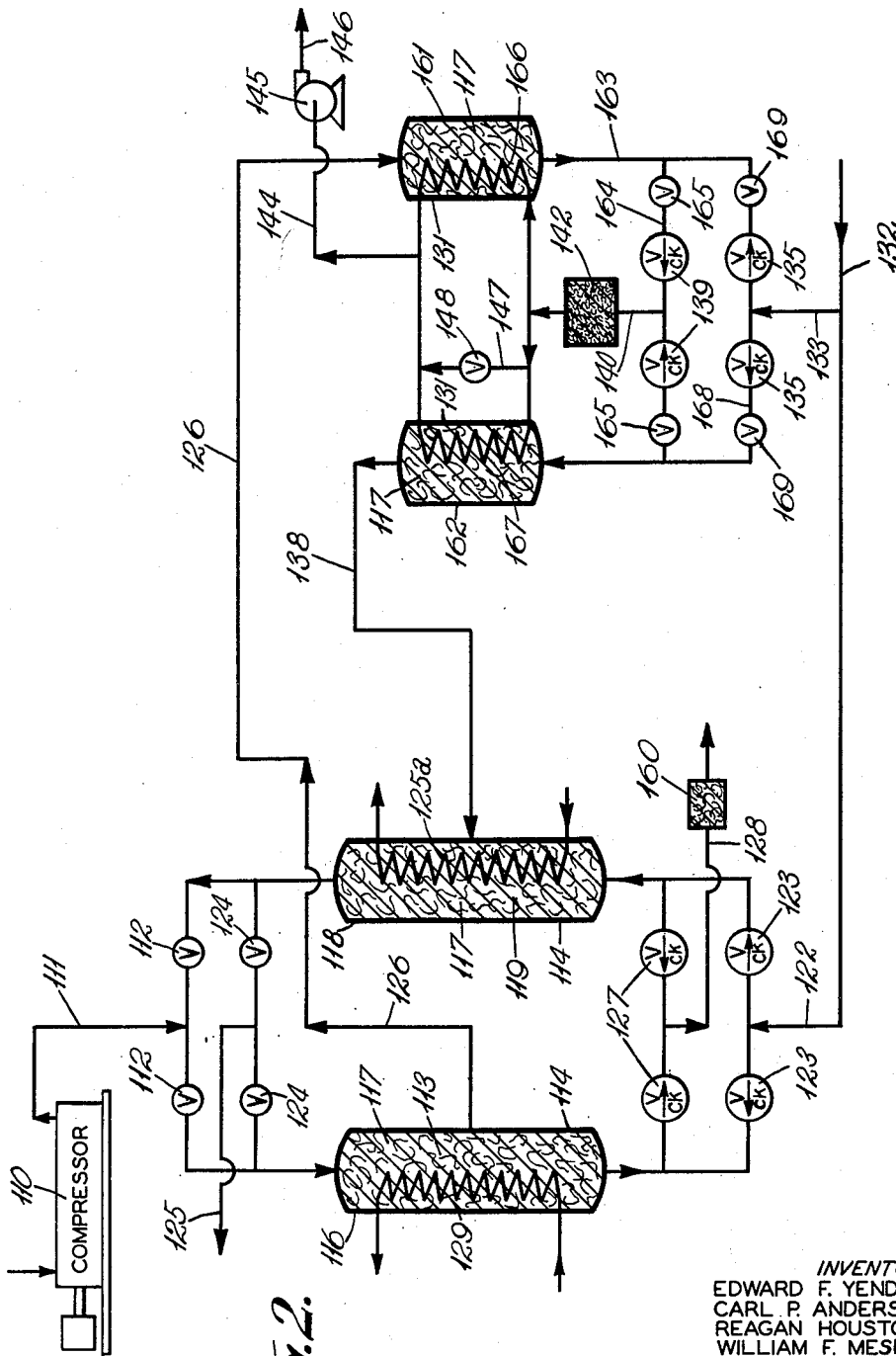
FIG. 2 is a flow diagram of a modified system according to the present invention, in which the air side-bleed is further cooled and cleaned in accumulators.

FIGURE 2 shows another important advantage of the present invention which is that the auxiliary heat exchange zone 131 may be automatically operated without requiring additional controls. This is because the reversing passageways 161 and 162 of second heat exchange zone 131 are preferably reversed simultaneously with the reversing passageways 113 and 119 of first heat exchange zone. The check valves 123 and 127 employed at the cold end of first main heat exchange zone 114 are duplicated by check valves 135 and 139 respectively at the cold end of second auxiliary heat exchange zone 131, and operation of the reversing valves 112 and 124 at the warm end of main heat exchange zone 114 imposes pressure variations which result in identical and simultaneous operation of both check valve systems.

A further advantage of this invention is that a pair of small accumulators instead of a passage exchanging heat exchanger may comprise the second auxiliary reversing heat exchange zone. Referring now to FIG. 2, the first main reversing heat zone 114 operates in the same manner as zone 14 of FIG. 1, with the additional step of further cleaning the cold end air in conduit 128 by passage through adsorption trap 160. Thus, any remaining carbon dioxide in the cold end air is removed before passage to the rectification means (not shown). The second auxiliary reversible heat exchange zone comprises a pair of small accumulators 161 and 162 both containing suitable packing material 117. Side-bleed air is directed through conduit 126 to the warm end of accumulator 161 for passage through the packed bed 117 for cooling and cleaning, and discharge through conduit 163 to branch conduit 164 containing air flow adjustment valves 165 and cold end check valves 139. The cooled and cleaned minor air stream is then recycled through conduit 140 containing adsorption trap 142 as a final cleanup means for removing residual carbon dioxide from such stream. The further cooled minor air stream is passed from the cold to the warm end of second auxiliary reversible heat exchange zone 162 through coils 166 and 167 embedded in the regenerative packing 117 of accumulators 161 and 162, respectively. The partially rewarmed minor air stream is directed from zone 162 into conduit 144 for work expansion through turbine 145 into conduit 146 for discharge as previously described. Conduit 147 containing control valve 148 is provided as a bypass around embedded coils 166 and 167 to balance flows in regenerators 161 and 162 and to permit adjustment of the temperature and flow of the turbine inlet stream and thus attain optimum expansion conditions. Although the illustrated embodiment shows simultaneous passage of recycling side-bleed air through both sets of embedded coils 166 and 167, it is to be understood that additional valving could be provided to restrict the zone 162 embedded coil flow to only the accumulator on air stroke or only the accumulator on purge stroke.

During the air stroke of accumulator 161, cold nitrogen purge gas is introduced through conduit 133 to branch conduit 168 for flow through check valve 135 and purge gas flow adjustment valve 169 to the cold end of accumulator 162. The purge gas flows from the cold to the warm end of accumulator 162, thereby evaporating the previously deposited carbon dioxide and simultaneously recooling the packing 117 for the next air stroke. The partially warm carbon dioxide laden nitrogen purge gas is discharged from the warm end of accumulator 162 into conduit 138 for passage to an intermediate thermal level of purging accumulator 118, as described in conjunction with FIG. 1. The minor air portion and purge gas flows are preferably reversed between auxiliary heat exchange zone accumulators 161 and 162 by the pressure variations caused by the switching of valves 112 and 124 at the warm end of main heat exchange zone 114. Even though two separate heat exchangers are required when cold accumulators comprise the second heat exchange zone, such accumulators may be preferable to reversing heat exchangers for some applications since they are relatively simple and economical to assemble. The cold accumulator embodiments of the invention also have the other previously discussed advantages over the prior art.

To obtain self-cleaning conditions in the main heat exchange zone, the ratio of reversing air to nitrogen purge gas in second auxiliary heat exchange zone 131 must be substantially greater than the ratio existing in main heat exchange zone 114. In the embodiment of FIG. 2, the necessary flow adjustment is accomplished by means of valves 165 in cold end branch conduit 164, one of which permits adjustment of the air flow through accumulator 161 and the other through accumulator 162. The nitrogen purge gas flow through each of these accumulators is separately adjusted for the same purpose by means of valves 169 in cold end branch conduit 168.

Figure 3:
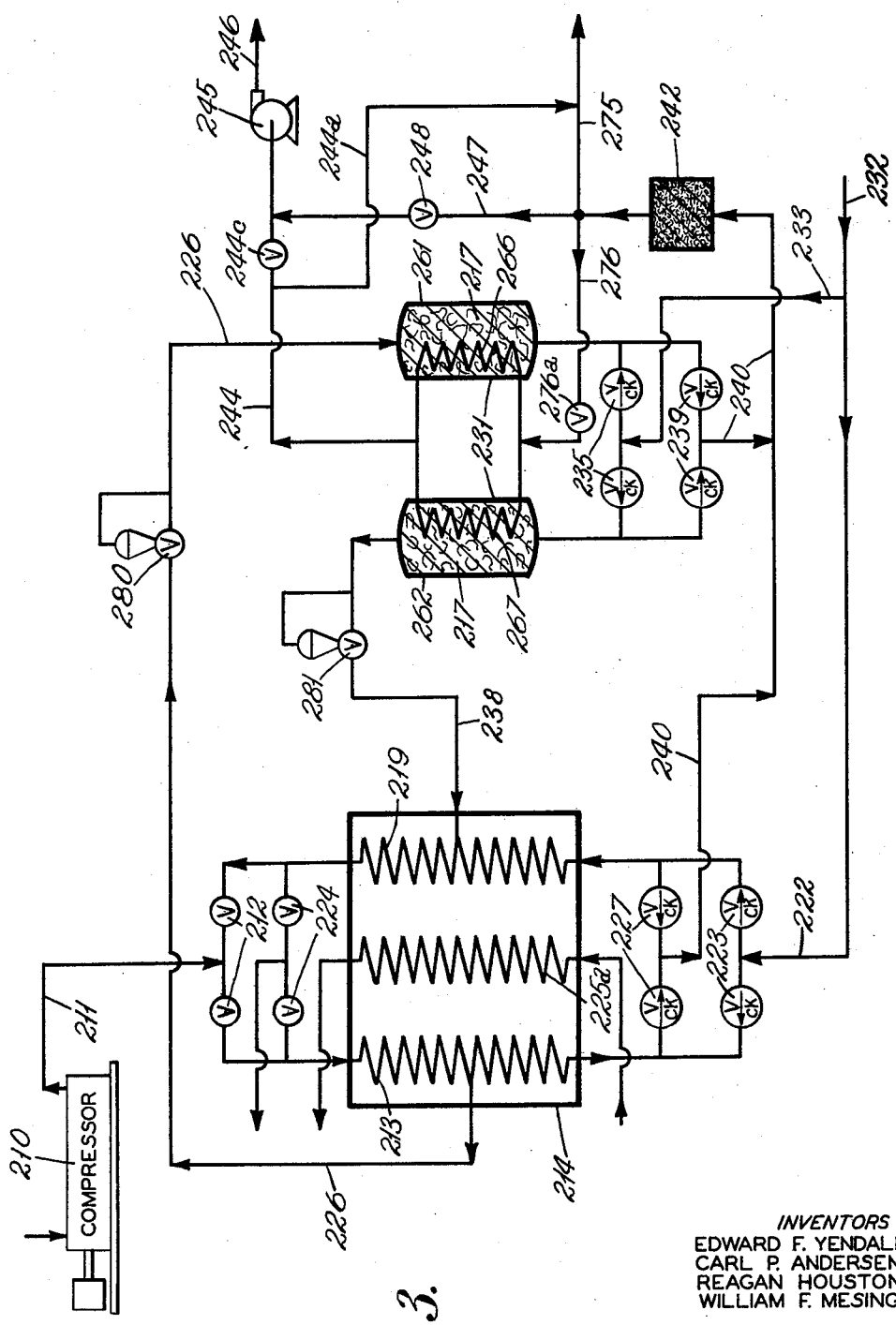
FIG. 3 is a flow diagram of another modified system in which the cold end air from the first main reversible heat exchange zone and further cooled air from the second auxiliary reversible heat exchange zone are mixed and subjected to a final cleanup step.

In FIG. 3 the first main reversible heat exchange zone comprises a three-pass reversing heat exchanger 214 including reversing passageways 213 and 219 and non-reversing passageway 225a, all in heat exchange relationship with each other. As illustrated, the inlet compressed air stream enters reversing passageway 213 at the warm end thereof for counter-current cooling against product oxygen gas in non-reversing passageway 225a and nitrogen purge gas in reversing passageway 219. The cooled and cleaned major portion of the compressed air stream is discharged from the cold end of zone 214 into conduit 240 and the cooled and cleaned minor portion of such stream is discharged from the cold end of second heat exchange zone 262 into conduit 240. Since the last two mentioned streams are preferably at about the same temperature, i.e. −173° C., they may be joined and passed through conduit 240 to adsorption trap 242 for removal of any remaining carbon dioxide. The further cleaned cold compressed air stream is discharged from such trap and divided into at least two parts. A major part is directed through branch conduit 275 to the rectification means, while a minor part is passed through branch conduit 276 and control valve 276a therein to the cold end of auxiliary heat exchange zone 231 for flow through embedded coils 266 and 267 and further processing as described in conjunction with FIG. 2. If desired, another minor part of the further cleaned cold compressed air stream may be bypassed around embedded coils 266 and 267 by flow through conduit 247 and control valve 248.

FIG. 3 also illustrates another method of adjusting the ratio of air to nitrogen purge gas in auxiliary heat exchange zone 231 for the attainment of self-cleaning conditions. This control or trimming is effected by means of valves 280 and 281 in conduits 226 and 238, respectively, communicating between main heat exchange zone 214 and auxiliary heat exchange zone 231. Whereas the trimming valves 165 and 169 of FIG. 2 are suited for manual operation, the trimming method of FIG. 3 requires that valves 280 and 281 be automatically operated. This is because the side-bleed air and purge nitrogen flows through accumulators 261 and 262 are periodically reversed, so that trimming valves 280 and 281 alternately process relatively high pressure air and low pressure nitrogen, and the settings must be reversed or altered for every cycle change to maintain proper control. The trim control must be connected with the cycle reversal of the warm end reversing valves 212 and 224 of main heat exchange zone 214 so that each trim valve may alter its control point to "match" the air and purge nitrogen strokes. This may be done, for example, by means of an electrical interconnection with the main heat exchange zone cycle controller (not shown) and with limit switches on valves 280 and 281. As illustrated in FIG. 3, the desired control is effected pneumatically, using the pressure variations accompanying the operation of switching valves 212 and 224.

Although in the previously discussed embodiments of the present invention illustrated in FIGS. 1-3, the partially warmed carbon dioxide-laden purge gas discharged from the warm end of the second auxiliary heat exchange zone is transferred to an intermediate thermal level of the main heat exchange zone, the refrigeration remaining in such purge stream may be recovered by other methods. For example referring now to FIG. 4, the partially rewarmed nitrogen purge gas discharged from the warm end of reversing passageway 336 of second auxiliary heat exchange zone 331 into conduit 338 is directed to conduit 386 for flow through reversing passageway 387 of third auxiliary or purge gas reversible heat exchange zone 388. The latter stream countercurrently cools a minor part of the compressed inlet air stream which has been diverted from conduit 311 through conduit 389 to branch conduit 390 containing automatic reversing valves 391 communicating with the warm end of second auxiliary heat exchange zone 388. The minor part of the inlet air stream is directed through reversing valve 391 to the warm end of reversing passageway 392 for countercurrent cooling by the nitrogen purge gas in thermally associated reversing passageway 387. Unless the inlet air stream has previously been treated for moisture removal, such moisture will be frozen out in the passageway as ice during the cooling step. The partially cooled minor air part is discharged from the cold end of reversing passageway 392 into conduit 393 at about −91° C., and mixed with the side-bleed air in conduit 326 for passage to second auxiliary heat exchange zone. The side-bleed air has previously been diverted from reversing passageway 317 through conduit 326 and automatic control valve 380, and during this stroke there is no flow through automatic control valve 381 in conduit 338a connecting reversing passageway 319 with conduit 386. However, when the flows are switched, side-bleed air flows through conduit 338a and conduit 386 to reversing passageway 336 in second auxiliary heat exchange zone 331, as will be understood by those skilled in the art. The further warmed carbon dioxide laden nitrogen purge gas is discharged from the warm end of reversing passageway 387 into branch conduit 394 and automatic reversing valve 395 therein, and hence through conduit 396 for discharge to the atmosphere or further processing as desired. Although third auxiliary heat exchange zone 388 has been described as constituting a passage exchanging reversing heat exchanger, a pair of relatively small accumulators similar to those illustrated in FIG. 3 would also be suitable for processing the diverted minor compressed air part and the partially warmed nitrogen purge gas. In the event that the inlet air stream has previously been treated for moisture removal, then it is not essential to operate the third auxiliary heat exchange zone 388 on a reversing cycle. In such case, the automatic valves 391 and 395, with their interconnecting piping may be transferred to the colder end of zone 388.

The air and purge nitrogen flows are periodically reversed between passageways 387 and 392 by means of reversing valves 391 and 395, and the purge gas will additionally evaporate and remove any water previously deposited in such passageways. These valves may in turn be actuated by the pressure variations caused by operation of main heat exchange zone reversing valves 312 and 324. Alternatively, if the latter valves operate on a timed cycle, valves 391 and 395 would be reversed after the same intervals since the corresponding reversing valves of the main first auxiliary and second auxiliary heat exchange zones are preferably repositioned at substantially the same moment.

Figure 4:
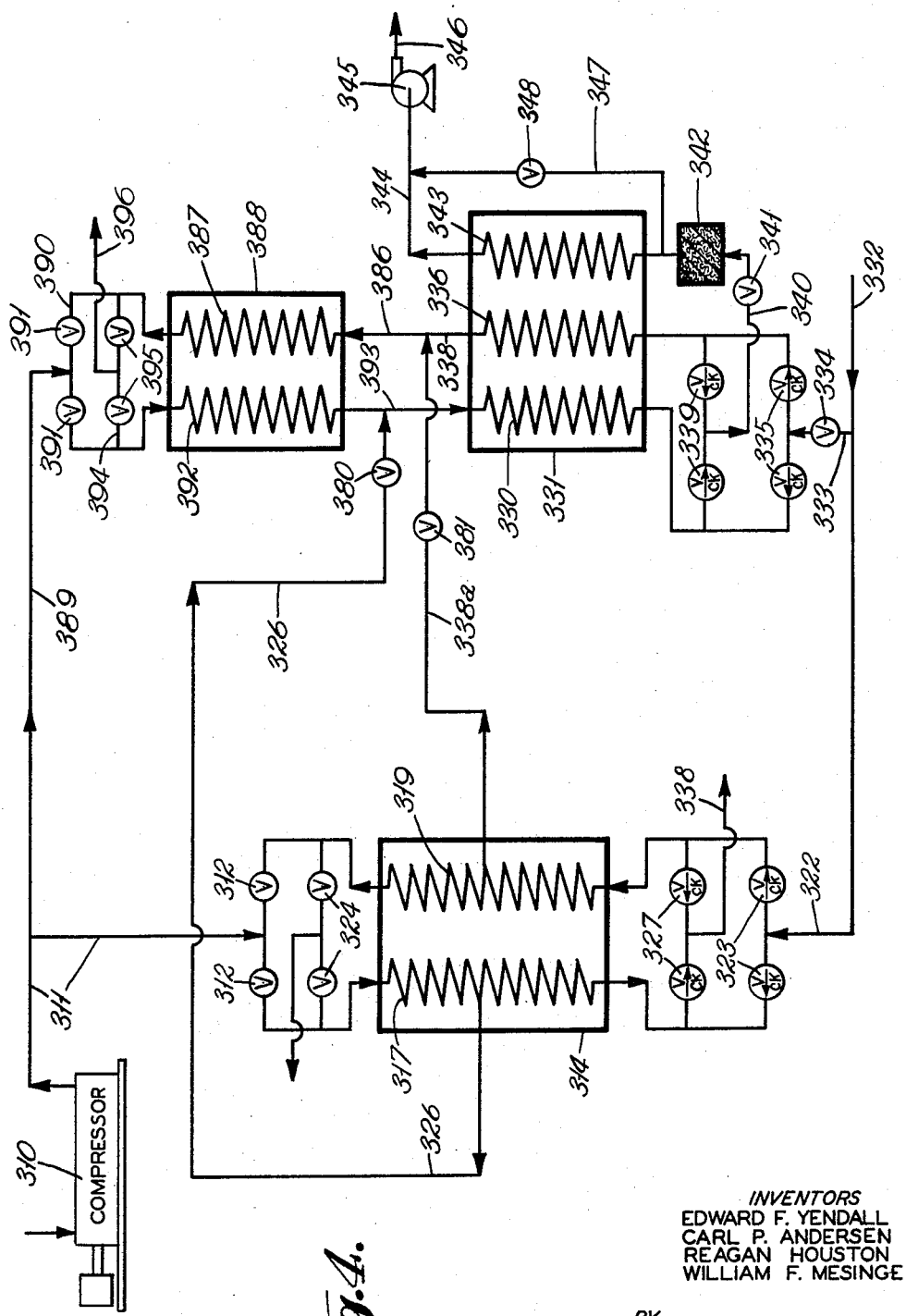
FIG. 4 is a flow diagram of still another modified system in which the purge gas discharged from the second auxiliary reversible heat exchange zone cools and partially cleans a minor part of the compressed air stream in a third auxiliary reversible heat exchange zone.

FIG. 4 and (FIG. 1) also illustrate still another arrangement for adjusting the air and purge nitrogen flows through second auxiliary heat exchange zone 331. The components for effecting such control include trim valve 334 in the cold nitrogen purge gas manifold 333, and trim valve 341 in the recycling air side-bleed conduit 340. It will be readily apparent that this arrangement is simpler and less costly than the four-valve flow adjustment system of FIG. 2. However, it does no provide as positive a control as the latter because the flow resistances may not be the same in the two reversing passageways 330 and 336. Valves 334 and 341 provide close regulation for the division of air and nitrogen purge gas between main and second auxiliary heat exchange zones 314 and 331, but they cannot readily compensate for different flow resistances in the reversing passageways 330 and 336, whereas the FIG. 2 arrangement may effect this adjustment. The simplified valve arrangement of FIGS. 1 and 4 may be applicable when second auxiliary heat exchange zone 331 is of the passage exchanging type because flow resistances are apt to be approximately equal in each reversing passage. However, if zone 331 comprises regenerators, then a greater variation can be expected between the two reversing passages, and the more positive control arrangement of FIG. 2 will probably be needed.

Figure 5:
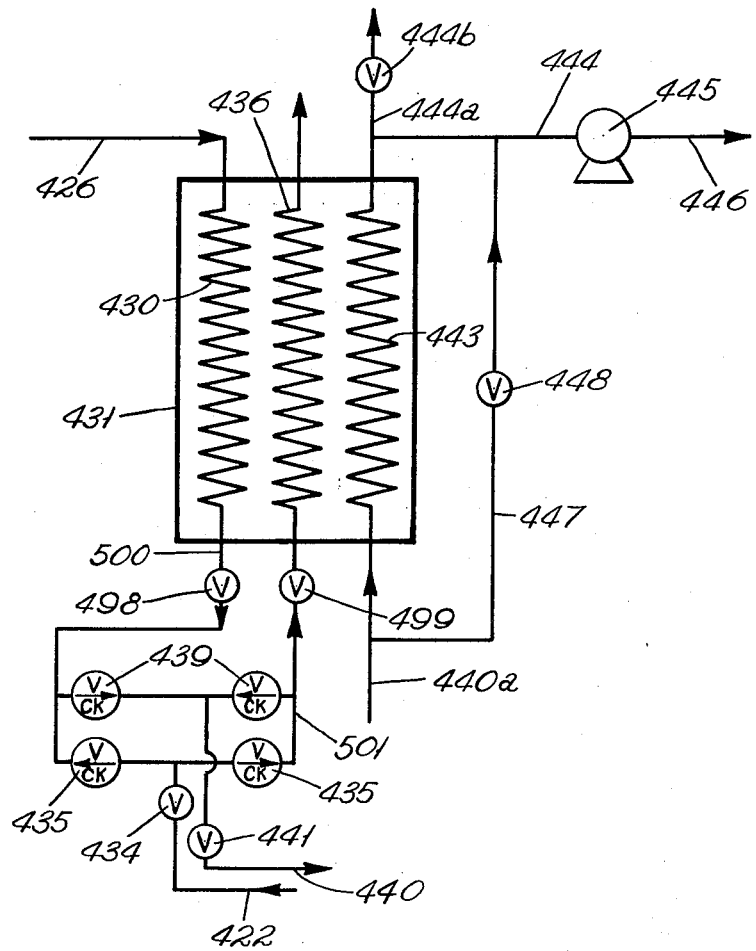
FIG. 5 is a flow diagram of a further modified second auxiliary reversible heat exchange zone according to the present invention.

FIG. 5 illustrates still a further method of obtaining the desired flow adjustment between the reversible passages of the second auxiliary heat exchange zone 431. This is another four-valve arrangement, but each valve controls only one variable. Trim valves 434 and 441 are in the nitrogen and air manifold, respectively, and control the division of these streams between the main heat exchange zone (not illustrated) and the first auxiliary heat exchange zone 431. Valve 441 in conduit 440 controls exchange zone 431. Valve 441 in conduit 440 controls the total amount of side-bleed air and is adjusted for the desired amount of flow unbalance in the main heat exchange zone. Valve 434 in purge gas conduit 422 is adjusted for a preselected ratio of purge gas to side-bleed air. Valves 498 and 499 in cold end discharge conduits 500 and 501, respectively, from reversing passageways 430 and 436 are adjusted as required to equalize flow resistances through the reversing passages.

In the previously described FIGS. 1–4, the second cold gas stream conducted through the non-reversing passageway of the second auxiliary heat exchange zone was provided by recycling at least part of the cold, cleaned side-bleed air from the cold end of such zone. The second gas stream may also be provided from an independent source, as illustrated in FIG. 5. Such stream is introduced in conduit 440a, and may for example comprise a gas obtained from the rectification column, such as oxygen-enriched air.

Although the preferred embodiments have been described in detail, it is contemplated that modifications of the process and the apparatus may be made and that some features may be employed without others, all within the spirit and scope of the invention as set forth herein.

What is claimed is:

1. A process for the low-temperature separation of low-boiling condensables from a compressed gas stream including the steps of providing such stream at an inlet pressure below about 150 p.s.i.g.; passing at least most of such stream to a first main reversible heat exchange zone; partially cooling the stream to a temperature slightly warmer than the saturation point of said low-boiling condensables; dividing the partially cooled stream into major and minor portions; further cooling the major portion to a low temperature in the first exchange zone and simultaneously depositing at least most of its low-boiling condensables in such zone; discharging the further cooled and cleaned major portion of said compressed gas stream from the cold end of the first heat exchange zone; diverting the partially cooled minor portion of said compressed gas stream from the first heat exchange zone and conducting such minor portion at about said inlet pressure to a first reversing passageway in a second auxiliary reversible heat exchange zone, said second auxiliary reversible heat exchange zone being in parallel flow relationship with said first main reversible heat exchange zone; providing a cold purge gas stream at about said low temperature at the cold end of a second reversing passageway of said second auxiliary heat exchange zone; providing a second cold gas stream at about said low temperature at the cold end of a first non-reversing passageway of such second heat exchange zone; further cooling the partially cooled minor portion in the second heat exchange zone by heat exchange with the purge gas stream in said second reversing passageway and with the second cold gas stream in said first non-reversing passageway to a sufficiently low temperature for deposition of at least most of the low-boiling condensables of the minor portion in said first reversing passageway; discharging the further cooled and cleaned minor portion of said compressed gas stream from the cold end of said first reversing passageway; discharging the partially rewarmed second gas stream from the warm end of said first non-reversing passageway of second auxiliary heat exchange zone at an intermediate temperature; periodically reversing the partially cooled minor portion and the purge gas stream between said first and second reversing passageways for evaporation of the previously deposited condensables into the purge gas stream; and discharging the partially warmed condensable-laden purge gas stream from the warm end of said second auxiliary reversible heat exchange zone.

2. A process for the low-temperature separation of low-boiling condensables from a compressed gas stream including the steps of providing such stream at an inlet pressure below about 150 p.s.i.g.; passing at least most of such stream to a first main reversible heat exchange zone; partially cooling the stream to a temperature slightly warmer than the saturation point of said low-boiling condensables; dividing the partially cooled stream into major and minor portions; further cooling the major portion to a low temperature in the first exchange zone and simultaneously depositing at least most of its low-boiling condensables in such zone; discharging the further cooled and cleaned major portion of said compressed gas stream from the cold end of the first heat exchange zone; diverting the partially cooled minor portion of said compressed gas stream from the first heat exchange zone and conducting such minor portion to a first reversing passageway in a second auxiliary reversible heat exchange zone; providing a cold purge gas stream at about said low temperature at the cold end of a second reversing passageway of said second auxiliary heat exchange zone; further cooling the partially cooled minor portion in the second heat exchange zone by heat exchange with the purge gas stream in said second reversing passageway and with a second cold stream in a first non-reversing passageway to a sufficiently low temperature for deposition of at least most of the low-boiling condensables of the minor portion in said first reversing passageway; discharging the further cooled and cleaned minor portion from the cold end of said first reversing passageway and recycling at least part of such minor portion in said first non-reversing passageway in countercurrent heat exchange relation with said partially cooled minor portion as said second cold stream; discharging the cleaned and partially rewarmed recycling minor portion of said compressed gas stream from the warm end of the said first non-reversing passageway of second auxiliary heat exchange zone at an intermediate temperature; periodically reversing the partially cooled minor portion and the purge gas stream between said first and second reversing passageways for evaporation of the previously deposited condensables into the purge gas stream; and discharging the partially warmed condensable-laden purge gas stream from the warm end of said second auxiliary reversible heat exchange zone.

3. A process for the low-temperature separation of low-boiling condensables from a compressed air stream including the steps of providing such stream at an inlet pressure below about 150 p.s.i.g.; passing at least most of such stream to a first main reversible heat exchange zone; partially cooling the stream to a temperature slightly warmer than the saturation point of said low-boiling condensables; dividing the partially cooled stream into major and minor portions; further cooling the major portion to a first low temperature in the first exchange zone and simultaneously depositing at least most of its low-boiling condensables in such zone; discharging the further cooled and cleaned major portion of said compressed air stream from the cold end of the first heat exchange zone; separating at least part of said cooled and cleaned portion into air components; diverting the partially cooled minor portion of said compressed air stream from the first heat exchange zone and conducting such minor portion to a first reversing passageway in a second auxiliary reversible heat exchange zone; providing as a purge gas stream an air component from the separation step at about said first low temperature at the cold end of a second reversing passageway of said second auxiliary heat exchange zone; further cooling the partially cooled minor portion in the second heat exchange zone by heat exchange with the purge gas stream in said second reversing passageway and with a second cold stream in a first non-reversing passageway to a sufficiently low temperature for deposition of at least most of the low-boiling condensables of the minor portion in said first reversing passageway; discharging the further cooled and cleaned minor portion from the cold end of said first reversing passageway and recycling at least part of such minor portion in said first non-reversing passageway in countercurrrent heat exchange relation with said partially cooled minor portion as said second cold stream; discharging the cleaned and partially rewarmed recycling minor portion of said compressed air stream from the warm end of said first non-reversing passageway of the second auxiliary heat exchange zone at an intermediate temperature; periodically reversing the partially cooled minor portion and the purge gas stream between said first and second reversing passageways for evaporation of the previously deposited condensables into the purge gas stream; and discharging the partially warmed condensable-laden purge gas stream from the warm end of said second auxiliary reversible heat exchange zone.

4. A process according to claim 3 for the low-temperaature separation of low-boiling condensables from a compressed air stream, in which any condensables remaining in the further cooled and cleaned minor portion of such air stream are removed before recycling through said first non-reversing passageway of said second auxiliary reversible heat exchange zone.

5. A process according to claim 3 for the low-temperature separation of low-boiling condensables from a compressed air stream, in which said partially cooled minor portion of said compressed air stream is further cooled in said second auxiliary reversible heat exchange zone to a temperature within 15° C. of said first low temperature of the further cooled major portion.

6. A process according to claim 3 for the low-temperature separation of low-boiling condensables from a compressed air stream, in which the further cooled major and minor portions of said air stream are joined, and the combined stream is again divided into major and minor portions for recycling of a minor portion through said first non-reversing passageway.

7. A process according to claim 3 for the low-temperature separation of low-boiling condensables from a compressed air stream, in which at least part of the cleaned and partially warmed recycled minor portion of said compressed air stream discharged from the warm end of said first non-reversing passageway is expanded to a low pressure with the production of external work.

8. A process according to claim 3 for the low-temperature separation of low-boiling condensables from a compressed air stream, in which at least part of the compressed air stream is conducted to a third reversing passageway in said first main reversible heat exchange zone, a major part of said air component from the separation step is provided at the cold end of a fourth reversing passageway in the main heat exchange zone and conducted therethrough in countercurrent heat exchange with the cooling compressed air stream in said third reversing passageway, a minor part of said air component serves as said purge gas stream in said second auxiliary heat exchange zone; at least part of said partially warmed condensable-laden purge gas stream discharged from the warm end of said second auxiliary reversible heat exchange zone is joined with the partially warmed major part of said air component at an intermediate thermal level in said first main reversible heat exchange zone, and the compressed air stream and the major part of said air component are periodically reversed between said third and fourth reversing passageways for evaporation of the previously deposited condensables into the air component major part.

9. A process according to claim 8 for the low-temperature separation of low-boiling condensables from a compressed air stream, in which the gas stream flowing through the first and second reversing passageways of said second auxiliary reversing heat exchange zone, and the gas streams flowing through the third and fourth reversing passageways of said first main reversing heat exchange zone are simultaneously periodically reversed.

10. A process according to claim 8 for the low-temperature separation of low-boiling condensables from a compressed air stream, in which the relative compressed air and purge gas flows in said first main reversible heat exchange zone and the relative minor air portion and purge gas flows in said second auxiliary reversible heat exchange zone are separately adjusted to maintain such heat exchange zones in a self-cleaning condition.

11. A process according to claim 3 for the low-temperature separation of low-boiling condensables from a compressed air stream, including the steps of diverting a minor part of the compressed air stream to a fifth reversing passageway in a third auxiliary reversible heat exchange zone for countercurrent heat exchange and cooling to a temperature slightly warmer than the saturation point of said low-boiling condensables by at least part of said purge gas stream flowing through a sixth thermally associated reversing passageway, said purge gas stream entering the sixth passageway from the warm end of said second auxiliary reversible heat exchange zone; reversing the minor air part and the purge gas flows between said fifth and sixth reversing passageways simultaneously with the periodic flow reversals between said first and second reversing passageways of the second heat exchange zone; and joining the partially cooled minor air part with said partially cooled minor portion of said compressed air stream for further cooling and cleaning in said second heat exchange zone.

12. Apparatus for the low-temperature separation of low-boiling condensables from a compressed gas stream including means by which a feed stream containing low-boiling condensables is provided at an inlet pressure below about 150 p.s.i.g.; a first main reversible heat exchange zone for partially cooling the feed stream to a temperature slightly warmer than the saturation point of said low-boiling condensables; means for dividing the partially cooled stream into major and minor portions and diverting the minor portion; means for further cooling the major portion in the main heat exchange zone to a low temperature so that at least most of its low-boiling condensables are deposited therein; means for discharging the further cooled and cleaned major portion of the compressed feed gas stream from the cold end of said main heat exchange zone; a second auxiliary reversible heat exchange zone, said second auxiliary reversible heat exchange zone being in parallel flow relationship with said first reversible heat exchange zone and having at least first and second thermally associated reversing passageways for alternate flow of the withdrawn minor portion at about said inlet pressure therethrough; means for providing a cold purge gas stream at about said low temperature at the cold end of the auxiliary heat exchange zone for alternate flow through the second and first reversing passageways and countercurrent further cooling of the withdrawn minor portion to a sufficiently low temperature for deposition of at least most of the low-boiling condensables of the minor portion in the reversing passageway; a first non-reversing passageway in the second auxiliary reversible heat exchange zone thermally associated with said first and second reversing passageways; means for providing a second cold gas stream at about said low pressure at the cold end of said auxiliary heat exchange zone for flow through said first non-reversing passageway so as to provide part of the refrigeration necessary to further cool the minor portion of the compressed gas feed stream to said low temperature; means for discharging the further cooled and cleaned minor portion of the compressed gas stream from the cold end of the auxiliary heat exchange zone; means for discharging the partially rewarmed second gas stream from the warm end of such passageway at an intermediate temperature; means for periodically reversing the partially cooled withdrawn minor portion and the cold purge gas stream between said first and second reversing passageways for evaporation of the previously deposited condensables into the purge gas stream; and means for discharging the partially warmed condensable-laden purge gas stream from the warm end of said second auxiliary reversible heat exchange zone.

13. Apparatus for the low-temperature separation of low-boiling condensable from a compressed gas stream including means by which a feed stream containing low-boiling condensables is provided at an inlet pressure below about 150 p.s.i.g.; a first main reversible heat exchange zone for partially cooling the feed stream to a temperature slightly warmer than the saturation point of said low-boiling condensables; means for dividing the partially cooled stream into major and minor portions and diverting the minor portion; means for further cooling the major portion in the main heat exchange zone to a low temperature so that at least most of its low-boiling condensables are deposited therein; means for discharging the further cooled and cleaned major portion of the compressed feed gas stream from the cold end of said main heat exchange zone; a second auxiliary reversible heat exchange zone having at least first and second thermally associated reversing passageways for alternate flow of the withdrawn minor portion therethrough; means for providing a cold, clean purge gas stream at about said low temperature at the cold end of the auxiliary heat exchange zone for alternate flow through the second and first reversing passageways and countercurrent further cooling of the withdrawn minor portion to a sufficiently low temperature for deposition of at least most of the low-boiling condensables of the minor portion in the reversing passageway; a first non-reversing passageway in the second auxiliary reversible heat exchange zone thermally associated with said first and second reversing passageways for flow therethrough of a second cold stream which provides part of the refrigeration necessary to further cool the minor portion of the compressed gas feed stream to said low temperature; means for discharging the further cooled and cleaned minor portion from the cold end of the auxiliary heat exchange zone and recycling at least part of such discharged minor portion to the cold end of said first non-reversing passageway as said second cold stream for flow therethrough in countercurrent heat exchange with the cooling minor portion; means for discharging the clean and partially rewarmed recycling minor portion from the warm end of such passageway at an intermediate temperature; means for periodically reversing the partially cooled withdrawn minor portion and the cold purge gas stream between said first and second reversing passageways for evaporation of the previously deposited condensables into the purge gas stream; and means for discharging the partially warmed condensable-laden purge gas stream from the warm end of said second auxiliary reversible heat exchange zone.

14. Apparatus according to claim 13 for the low-temperature separation of low-boiling condensables from a compressed gas stream, in which means are provided for removing any condensables remaining in the further cooled and cleaned minor portion of the compressed feed gas stream before passage to the means for recycling such minor portion to the cold end of said first non-reversing passageway of the second auxiliary reversible heat exchange zone.

15. Apparatus according to claim 13 for the low-temperature separation of low-boiling condensables from a compressed gas stream, including means for joining the further cooled major and minor portions of the compressed gas feed streams, means for again dividing the combined cold stream into major and minor portions for passage of a minor portion to the means for recycling to the cold end of said first non-reversing passageway.

16. Apparatus according to claim 13 for the low-temperature separation of low-boiling condensables from a compressed gas stream, including means for expanding the partially rewarmed recycling minor portion to a low pressure with the production of external work.

17. Apparatus according to claim 13 for the low-temperature separation of low-boiling condensables from a compressed gas stream including third and fourth thermally associated reversing passageways in the main reversible heat exchange zone for alternate flow of the compressed gas feed stream therethrough; means for providing a cold clean purge gas stream at about said low temperature at the cold end of the main heat exchange zone for alternate flow through said fourth and third reversing passageways so as to counter-currently cool the major portion of such feed stream to said first low temperature; means for joining at least part of said partially warmed condensable-laden purge gas stream discharged from the warm end of the second auxiliary heat exchange zone with the partially warmed purge gas stream at an intermediate thermal level in the main heat exchange zone; and means for periodically reversing the compressed gas and purge gas flows between said third and fourth reversing passageways for evaporation of the previously deposited condensables into the purge gas stream.

18. Apparatus according to claim 13 for the low-temperature separation of low-boiling condensables from a compressed gas stream including means for diverting a minor part of the compressed gas feed stream; a third auxiliary reversible heat exchange zone including at least fifth and sixth thermally associated reversing passageways; means for passing the diverted minor part alternately to the fifth and sixth passageways for countercurrent cooling to a temperature slightly warmer than the saturation point of said low-boiling condensables; means for alternately passing at least part of said partially warmed condensable-laden purge gas stream through the sixth and fifth passageways to effect said countercurrent cooling of said diverted minor part of the compressed gas feed stream; means for reversing said diverted minor part and the purge gas flows between said fifth and sixth passageways simultaneously with the periodic flow reversals between said first and second reversing passageways of the second heat exchange zone; and means for joining the partially cooled minor part with said partially cooled minor portion of said compressed gas feed stream for further cooling and cleaning in said second heat exchange zone.

19. Apparatus according to claim 17 for the low-temperature separation of low-boiling condensables from a compressed gas stream, including means for separately adjusting the relative flows of the compressed feed gas and purge gas in said first main reversible heat exchange zone and the relative minor feed gas portion and purge gas flows in said second auxiliary reversible heat exchange zone to maintain such heat exchange zones in a self-cleaning state.

20. Apparatus according to claim 17 for the low-temperature separation of low-boiling condensables from a compressed gas stream, including common means for supplying said cold, clean purge gas stream to the cold end of said main and auxiliary reversible heat exchange zones, and valves communicating with the cold ends of the first and second reversing passageways of said second auxiliary reversible heat exchange zone for separately adjusting the relative flows of the compressed feed gas and purge gas in the first heat exchange zone and the minor feed gas portion and purge gas flows in the second exchange zone to maintain such zones in a self-cleaning state.

21. Apparatus according to claim 17 for the low-temperature separation of low-boiling condensables from a compressed gas stream, including flow adjusting valves in the means for diverting and passing the partially cooled minor portion to the warm end of said second auxiliary heat exchange zone, and in the means for joining the partially warmed purge gas stream from the second zone with the partially warmed purge gas stream in said first main reversible heat exchange zone, such valves being provided for separate adjustment of the relative flows of compressed feed gas and purge gas in the first heat exchange zone and the relative flows of the minor feed gas portion and purge gas in the second heat exchange zone to maintain such zones in a self-cleaning state.

22. A process according to claim 3 for the low-temperature separation of low-boiling condensables from a compressed air stream, including the steps of diverting a minor part of the compressed air stream to a passageway in a third auxiliary heat exchange zone for countercurrent heat exchange and cooling to a temperature slightly warmer than the saturation point of said low-boiling condensables by at least part of said purge gas flowing through another thermally associated passageway, said purge gas stream entering the thermally associated passageway from the warm end of said second auxiliary reversible heat exchange zone; and joining the partially cooled minor air part with said partially cooled minor portion of said compressed air stream for further cooling and cleaning in the second heat exchange zone.

23. Apparatus according to claim 13 for the low-temperature separation of low-boiling condensables from a compressed gas stream including means for diverting a minor part of the compressed gas feed stream; a third auxiliary heat exchange zone including at least two thermally associated passageways; means for passing the diverted minor part to one of such passageways for countercurrent cooling to a temperature slightly warmer than the saturation point of said low-boiling condensables; means for passing at least part of said partially warmed condensable-laden purge gas stream through the other of such passageways to effect said countercurrent cooling of said diverted minor part of the compressed gas feed stream; and means for joining the partially cooled minor part with said partially cooled minor portion of said compressed gas feed stream for further cooling and cleaning in the second heat exchange zone.

References Cited in the file of this patent
UNITED STATES PATENTS

| | | |
|---|---|---|
| 2,504,051 | Scheibel | Apr. 11, 1950 |
| 2,534,478 | Roberts | Dec. 19, 1950 |
| 2,622,416 | Ogorzaly | Dec. 23, 1952 |
| 2,673,456 | Scharmann | Mar. 20, 1954 |
| 2,699,047 | Karwat et al. | Jan. 15, 1955 |
| 2,763,138 | Tsunoda | Sept. 18, 1956 |
| 2,777,299 | Skaperdas | Jan. 15, 1957 |
| 2,824,428 | Yendall | Feb. 25, 1958 |
| 2,881,595 | Fetterman | Apr. 14, 1959 |
| 2,932,174 | Schilling | Apr. 12, 1960 |
| 2,955,434 | Cost | Oct. 11, 1960 |